United States Patent Office 3,038,298
Patented June 12, 1962

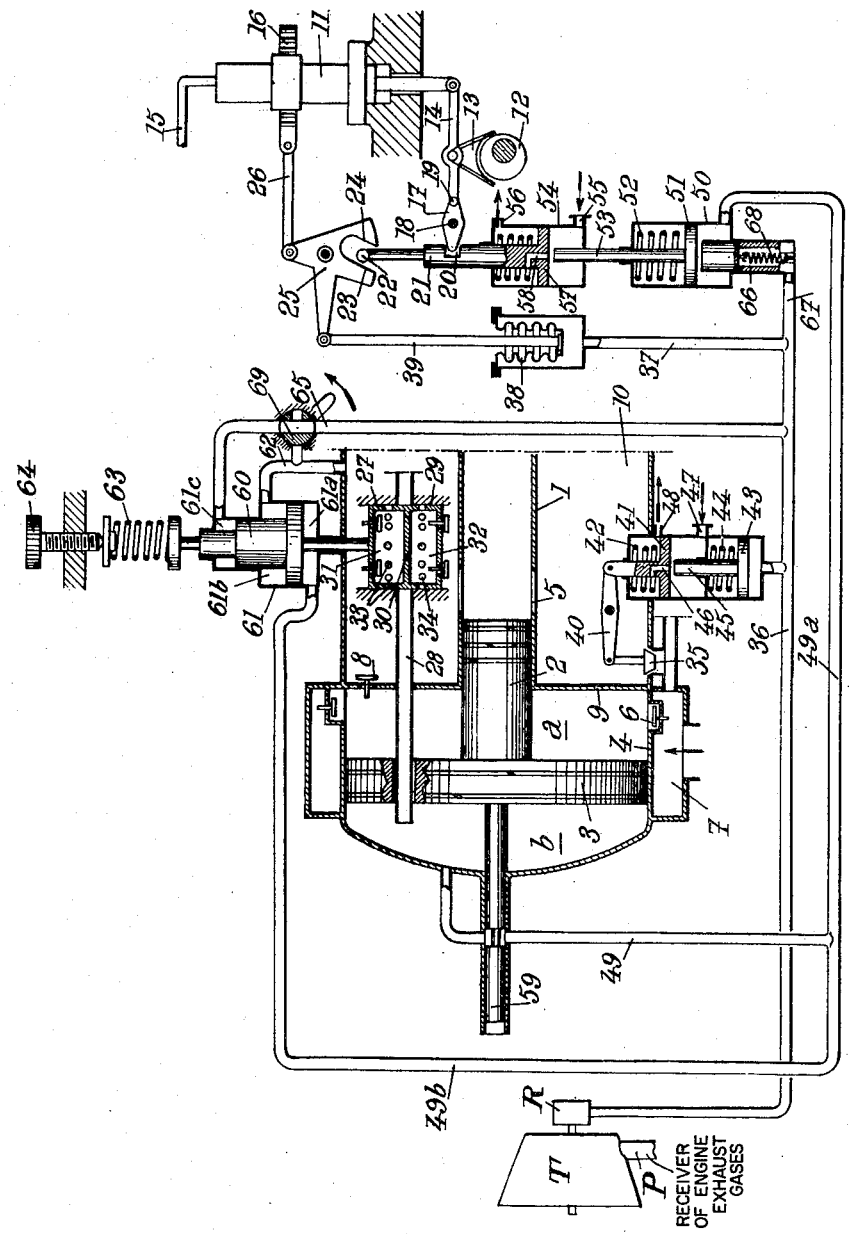

3,038,298
INSTALLATIONS COMPRISING AT LEAST ONE FREE PISTON GAS-GENERATOR AND A MACHINE DRIVEN BY THE POWER GAS PRODUCED BY SAID GAS-GENERATOR
Helge Horgen, Lyons, France, assignor to "Societe d'Etudes et de Participations Eau, Gaz, Electricite, Energie S.A.," Geneva, Switzerland, a society of Switzerland
Filed Mar. 31, 1958, Ser. No. 725,166
Claims priority, application France Apr. 5, 1957
9 Claims. (Cl. 60—13)

This invention relates to the controlling of installations of the kind comprising at least one free-piston gas-generator and a machine, more particularly but not exclusively a turbine, driven by the power gas produced by the gas-generator.

In installations of the kind specified it is known to regulate, for instance, the amount of fuel injected into the driving part of the gas-generator in dependence upon an external factor such as, for instance, the speed of the turbine which is driven by the power gas delivered by the gas-generator. Impulses derived from the turbine governor or from a control station are external control pulses for the gas-generator.

It is also known to control other elements of the gas-generator by impulses corresponding to internal factors of the gas-generator, such as its operating pressure and/or a characteristic pressure of its return energy pneumatic accumulators or cushions, and/or the length of stroke of its free pistons. Amongst the elements controlled heretofore solely by internal control pulses there can be mentioned the device known as a stabiliser which controls, in dependence upon the operating pressure of the gas-generator, the quantity of air in the cushions, the device controlling the timing of fuel injection into the driving part of the gas-generator, and the device controlling the upper and lower limits of the amount of fuel injected into the driving part for each operating pressure of the gas-generator.

When certain of the controls, such for example as the stabiliser, the fuel injection timing control and the device controlling the limits of the amount of fuel injected, are operated, as is customary, only in dependence upon internal factors, there is an undesirable time lag in the movements of the controls to their full extent. It is the principal object of the present invention to reduce this time lag.

According to the present invention, there is provided an installation comprising at least one free-piston gas-generator, a machine driven by the power gas from the gas-generator, and one or more control devices arranged to control the operation of the gas-generator in dependence upon one or more operating pressures of the gas-generator, characterised by means for applying to the one or more control devices a further controlling influence derived from the driven machine and such that the rate of response of the one or more control devices to a sudden change in load is substantially increased.

The invention will be described, by way of example, with reference to the accompanying drawing which shows parts of one embodiment of the invention.

The single FIGURE shows part of a gas-generator having opposed free pistons; the receiving machine, preferably in the form of a turbine driven by the power gas delivered by the gas-generator, is shown at T and the governor driven by the said turbine is shown at R.

The gas-generator can be designed in a variety of ways, for instance, as is diagrammatically illustrated in the drawing. The gas-generator shown therein comprises an engine cylinder 1 in which operate two engine pistons 2, only one of which (the piston on the left-hand side of the gas-generator) is shown. Each engine piston 2 forms part of a moving assembly also comprising a compressor piston 3 operating in a cylinder 4 divided by the piston 3 into two chambers $a$ and $b$, the chamber $a$ forming the compression chamber proper while the chamber $b$ contains an air cushion adapted to store energy during the outward stroke of the moving assembly 2, 3 and to restore such energy to the assembly 2, 3 during the inward stroke thereof.

The two moving assemblies 2, 3 of the gas-generator are synchronised in known manner by synchronising means (not shown). The piston 2 of one such assembly controls scavenge ports 5 of the engine cylinder 1, while the engine piston of the other assembly controls the exhaust ports (not shown) of the same driving cylinder 1. Through the exhaust ports there issues a mixture consisting of incompletely expanded combustion gases and of the excess of scavenge air from the engine cylinder, such mixture forming the power gas which the gas-generator delivers and which is transmitted through a pipe P to drive a receiving machine T.

The chamber $a$ of the cylinder 4 is provided with suction valves 6 through which air is drawn, during the outward stroke of the piston 3, into an intake manifold 7 surrounding the cylinder 4. The chamber $a$ is also provided with delivery valves 8 disposed in a partition 9 separating the chamber $a$ of the cylinder 4 from the engine-case 10 surrounding the engine cylinder 1 and serving for storage of the compressed air with which the engine cylinder is scavenged and supplied.

The driving part of the gas-generator, comprising the engine cylinder 1 and the opposed engine pistons 2, operates on a two-stroke cycle, ignition of the fuel being effected by the heat of compression of the combustion air which is compressed in the engine cylinder as the engine piston 2 moves towards the center of the engine cylinder. Fuel is injected into the engine cylinder by at least one injector (not shown) at a time when the engine pistons 2 are moving towards their inner dead point during their inward stroke, the fuel injector being supplied with fuel by an injection pump 11, the piston of which is driven, for instance by an eccentric 12 by way of a shoe 13 and lever 14, the eccentric 12 being driven, for instance, by a rocking shaft of the aforesaid synchronising means. The delivery pipe of the pump 11 has the reference 15.

The gas-generator comprises the following control elements:

(1) One element for controlling the amount of fuel injected into the engine cylinder during each oscillation of the moving assemblies, this fuel control element being formed, for instance, by a toothed rack 16 adapted to rotate the fuel injection pump piston (not shown) around its axis, the angular position of the last-mentioned piston determining in known manner the amount of fuel delivered by the piston during each delivery stroke thereof;

(2) An element for controlling fuel injection timing and being formed by a lever 17, pivotable around a fixed pivot 18, one of the ends of which carries the rotational axis 19 of the lever 14 forming part of the means for driving the pump 11, the other end of the lever 17 engaging in a recess 20 in a control rod 21 or being articulated thereto, and axial movement of the rod 21 causing pivoting of the lever 17 and thus altering the timing of the pump 11;

(3) An element formed by a stop 22 and serving to limit the movement of the toothed rack 16, the stop 22 co-operating to this end with two camming surfaces 23, 24 formed on a bell-crank lever 25 connected by way of a rod 26 to the toothed rack 16, the bell-crank lever 25 forming part of the control linkage for the toothed rack 16. The stop 22 is disposed between the camming surfaces 23, 24 and is carried by the rod 21 which controls the injection timing;

(4) A stabiliser 27 having the form of a slide valve interposed between the engine-case 10 and each of the cushions $b$ constituting the pneumatic return energy accumulators. Communication between the stabiliser and the cushions is by way of tubes 28 extending through the pistons 3 which slide thereon, sealing means being provided between the pistons 3 and tubes 28. The tubes lead into the wall of a cylinder 29 in which the slide valve 27 can slide. The slide valve is divided by a partition 30 into two chambers 31 and 32, the chamber 31 having non-return valves opening from the engine-case towards the chamber 31, while the chamber 32 has non-return valves which open from the chamber 32 towards the engine-case 10. Also, the side wall of each chamber 31, 32 is formed with apertures 33, 34. When the slide valve 27 is in the intermediate position shown in the figure, the apertures 33, 34 are closed and there is no air flow from the engine-case towards the cushions or vice versa. If the slide valve moves in such a manner that the apertures 33 communicate with the tubes 28, the compressed air in the engine-case flows into the cushions and thus charges them during the time that the pressure therein is less than the pressure in the engine-case. If the slide valve 27 moves in such a manner that the apertures 34 communicate with the tube 28, air escapes from the cushions to the engine-case during the time that the pressure in the cushions is greater than the pressure in the engine-case. Of course, matters must be so arranged that the pressure in the engine-case 10 is always greater than the pressure in the cushions $b$ when the moving assemblies are at their inner dead points, corresponding to minimum pressure in the cushions, and less than the pressure in the cushions when the moving assemblies are at their outer dead points, corresponding to maximum pressure in the cushions; and (5) An element 35 which, when the installation is running at a reduced or zero load, permits some of the compressed air in the engine-case 10 to escape, at least some of the air which thus escapes being conveyed to the intake manifold 7 to mix with the fresh air entering the chamber $a$ of the compressor cylinder 4 through the inlet valves 6.

Concerning the impulses controlling the various control members, the fuel-regulating element 16 and the element 35 which allows compressed air to escape from the engine-case 10 are controlled by external impulses produced, for instance, by a control station or by a governor R mounted on the turbine T driven by the power gas produced by the gas-generator, such impulses reaching the gas-generator through a conduit 36, in the form of pressure impulses. These pressure impulses are the greater as the load on the turbine is greater. To control the toothed rack 16, a conduit 37 branching off from the conduit 36 transmits the pressure in the conduit 36 to the space below a piston or bellows 38, the rod 39 of which is connected to the bell-crank lever 25 connected, as already stated, to the toothed rack 16. When the pressure in the conduit 36 rises, that is, when the load on the turbine increases so that the turbine usually slows down, the toothed rack increases the amount of fuel injected by the pump 11, whereas the amount of fuel injected is decreased by the toothed rack when the pressure in the conduit 36 decreases, such decrease corresponding to a reduction in the load on the turbine so that the turbine tends to speed up. The pressure in the conduit 36 also controls the valve 35 which is connected by a lever 40 to a piston 41 acted upon by a spring 42 which urges the lever 40 and valve 35 in a direction corresponding to an opening of the valve 35. On the other hand, a piston 43 which is subjected to the pressure in the conduit 36 and which is urged in the opposite direction by a spring 44 acts in a direction tending to close the valve 35. The pressures produced in the conduit 36 by the turbine governor, the sizes of the pistons and the strengths of the springs are so designed that the valve 35 is fully open for idling and gradually closes as the turbine loading and therefore the pressure in the conduit 36 increase. At an intermediate load the valve 35 closes completely so that above such load there is no further escape of compressed air through the valve 35.

The figure shows, between the piston 43 and piston 41, a hydraulic force-multiplier of known kind, wherein, as the piston 43 rises in its cylinder, a rod 45 approaches a calibrated conduit 46 which is formed in the piston 41 and through which extends an oil circuit, the entry of which is indicated at 47 and the exit of which is indicated at 48. The more the piston 43 rises with increasing pressure in the conduit 36, the more does the piston 41 rise too and compress the spring 42, and the more the valve 35 is closed.

The fuel control element 16 and the valve 35 are control elements which, under the definition hereinbefore given, are controlled by external control impulses.

The injection timing control element 17, the max./min. fuel stop 22 determining the limits within which the fuel control element 16 can be moved, and the stabiliser 27 are mainly controlled by internal control impulses.

The elements 17 and 22 are mainly controlled by a pressure derived from one of the cushions $b$ when the moving assemblies are in a predetermined position in their cylinders. To this end, there is provided a conduit 49, 49a opening at one end into the cushion $b$ and at the other into a cylinder 50 in which a piston 51 operates against a return spring 52, the rod 53 of the piston 51 acting, by way of a force-multiplier 54, similar to that hereinbefore described, upon the rod 21, the force-multiplier 54 comprising: an entry 55 and an exit 56 for pressure oil, a piston 57 rigidly secured to the rod 21 and a calibrated conduit 58 formed in the piston 57 and the rod 21 opposite the end of the rod 53, the conduit 58 being adapted to provide a communication between the two spaces on either side of the piston 57 inside the multiplier 54.

The conduit 49 is controlled by a slide valve 59 which is rigidly secured to one of the moving assemblies 1, 3 and which interrupts the conduit 49 in all positions of the moving assembly except that in which the assembly has the position at which the pressure in the cushion $b$ is to be sampled. The higher the sampled pressure, the higher the pressure acting on the piston 51 in the cylinder 50 and the higher the position of the rod 21.

The stabiliser 27 is controlled by a differential piston 60 moving in a cylinder 61. The piston 60 is acted upon by the pressure which is derived from the cushion and which also acts on the piston 51, this pressure being transmitted by way of the conduit 49b, to the chamber 61a of the cylinder 61. The piston 60 is also subjected to the pressure in the engine-case 10 which is applied to the chamber 61b of the cylinder 61 through a conduit 62, the latter pressure opposing the action of the pressure derived from the cushion. Also acting upon the piston 60 is a spring 63 operative in the same direction as the pressure in the engine-case 10 which is conveyed to the chamber 61b, the force exerted by the spring 63 being controllable, for instance, by means of a screw 64. Hence, if the pressure in the cushion $b$ is predominant, the stabiliser 27 moves in one direction and allows a predetermined amount of air to escape from the cushion to the engine-case 10, whereas the stabiliser 27 moves in the opposite direction and the amount of air in the cushion $b$ increases if the pressure in the engine-case 10 becomes predominant.

If the stabiliser 27, stop 22 and element 17 are controlled only by the aforesaid internal control impulses (pressure in the engine-case 10 and pressure derived from the cushion $b$), they operate with some delay when the turbine supplied by the gas-generator undergoes rapid load variations. If, for instance, owing to a sudden increase in the load of the turbine, its speed drops suddenly, there is an increase in pressure in the conduit 36, for instance, through the agency of the turbine governor. Such increase causes movement of the fuel control element 16, but the movement of the element 16 is limited by engagement of the cam 24 with the stop 22 and does not immediately correspond to the total increase in pressure in the conduit 36. The initial movement of the element 16 in the sense of increased injection causes a limited increase in the stroke of the free pistons and such limited increase produces a relatively slow increase in the rate of air flow into the engine-case 10. Through the agency of the stabiliser, this increase in air pressure in the engine-case 10 helps to charge the cushion $b$ and increases the pressure derived therefrom, so that the rod 21 rises and not only alters the timing but causes further movement of the element 16 in the sense of a further increase in fuel injected. It will be apparent that these operations occur stepwise and require time, so that there is considerable delay in establishing a new equilibrium corresponding to the suddenly increased load of the turbine.

To hasten the establishment of this new equilibrium as much as possible, a slight over-control of the gas-generator would be useful for a short time, in order that piston stroke may be as long as possible during the transition period. It would be advantageous if, during this transition period corresponding to a sudden increase in load, the outer dead points of the pistons could move as near as possible to the maximum permissible value and if the inner dead points could be as near as possible to the center of the machine. For this purpose the amount of air in the cushions would have to be increased rapidly, to provide inner dead points near the center, and the amount of fuel injected into the driving cylinder would have to be increased rapidly, thus enabling the increased resistance of the cushions to be overcome and the outer dead points of the pistons to be closer to their maximum value.

The invention accelerates the adaptation of the gas-generator delivery when there is an abrupt change in turbine loading, at least some of the elements controlled heretofore solely by internal pulses being controlled by an external correcting impulse dependent upon the loading of the turbine driven by the gas delivered by the gas-generator.

To this end, the piston 60 controlling the stabiliser 27 is subjected not only to the pressure derived from the cushion $b$ and to the pressure in the engine-case but also to the pressure in the conduit 36, the value of which is determined, for instance, by the turbine governor. For this purpose, the piston 60 is provided with a third step acted upon by the pressure in the conduit 36, the latter pressure being transmitted to the said third step through a conduit 65 opening into a chamber 61$c$ of the cylinder 61. Hence, when the fuel control element 16 is moved by a variation in pressure in the conduit 36, there is a simultaneous movement of the stabiliser 27 either in the direction corresponding to a filling of the cushions $b$, for an increase in the amount of fuel injected, or in the direction corresponding to a reduction in the filling of the cushions $b$, for a reduction in the amount of fuel injected.

It should be noted here that the action of the pressure in the conduit 36 of the stabiliser has an accelerating or correcting effect only if the variations of pressure in this conduit 36 are abrupt. In the case of slow pressure variations, that is in the case of slow variations in turbine loading, the operation of the stabiliser remains substantially the same, whether or not pressure pulses provided by the turbine governor are made to act. Of course, the surface of the piston 60 on which the pressure in the conduit 36 acts must be large enough to accelerate the movements of the stabiliser 27 when there is a rapid load variation, but not so large that the stabiliser is overloaded. In some cases, for instance, when an installation is started up, while one gas-generator forming part of an installation including a number of gas-generators is running up to pressure and has to be connected to the common header of the installation or when the pressure of such gas-generator drops when the same is not connected to the common header, it may be advisable not to allow the pressure pulses in the conduit 36 to act upon the stabiliser. Hence the conduit 65 is, with advantage, provided with a control element, for instance, in the form of a three-way cock 69 which in one position connects the conduit 36 to the chamber 61$c$ and in the other position connects the chamber 61$b$ to the chamber 61$c$ so that the pressure in the engine-case 10 is also operative in the latter chamber.

Preferably, the pressure in the conduit 36 acts on injection timing and on the stop 22, which limits the movement of the member 16, only if there is an abrupt increase in the turbine loading, and the said elements 17 and 22 are not subjected to the effect of a reduction in pressure in the conduit 36, that is, to the effect of pressure pulses initiated by the turbine governor when turbine loading decreases. This is why the pressure in the conduit 36, instead of acting directly on the piston 51 which operates the rod 21 through the agency of the force-multiplier, acts upon an intermediate piston 66 which under the influence of the pressure transmitted from the conduit 36 through a conduit 67, engages the piston 51 when the pressure in the conduit 36 increases abruptly. On the other hand, the piston 66, urged against the latter pressure by a spring 68, drops into its cylinder without moving the piston 51 if the pressure in the conduit 36 decreases rapidly. As a matter of fact, in the latter case, it is preferable for the stop 22 and element 17 not to be returned to the low-load position too abruptly, otherwise the strokes of the moving assemblies may become excessively short and stop the gas-generator for lack of scavenge air. Moreover, when the turbine loading decreases rapidly, the air or gas under pressure can always be discharged to atmosphere from the various chambers of the gas-generator and between the gas-generator and the turbine to prevent the same from racing, without any need to reduce the stroke of the free-piston assemblies too abruptly.

What I claim is:

1. In combination, a free piston auto-generator including a power cylinder and a compressor cylinder fixed with respect to each other, a power piston and a compressor piston freely movable in said cylinders respectively, said pistons being rigid with each other to form together a moving unit, means for feeding air under pressure from said compressor cylinder to said power cylinder, a discharge conduit leading from said power cylinder, a pneumatic energy accumulator for storing up energy from said moving unit during the power strokes thereof and restoring said energy to said unit during the return strokes thereof, means for feeding fuel to said power cylinder, a receiver machine having its intake connected to said discharge conduit so as to be operated by the gas stream issuing from said power cylinder, means for regulating said fuel feed means in response to variations in the load of said receiver machine, a stabilizer for varying the mass of air present in said accumulator in response to variations in the working pressure of said auto-generator, said stabilizer including, as control element thereof, a composite piston including three working surfaces and three cylinder elements to cooperate with said three working surfaces respectively, means for transmitting to one of said cylinder elements a pressure equal to that existing in said accumulator for a given position of said moving unit, so that said pressure acts on said composite piston in one direction, and means for transmitting to the other two cylinder elements, respectively, a pressure proportional to the working pressure of the generator and a pressure inversely proportional to the speed of said driven machine, so that said two last mentioned pressures act on said composite piston in a direction opposed to said first mentioned direction.

2. A combination according to claim 1 further including conduit and valve means for placing at will the two second mentioned cylinder elements in communication with each other and transmitting thereto a pressure proportional to said working pressure of the generator.

3. In combination, a free piston auto-generator including a power cylinder and a compressor cylinder fixed with respect to each other, a power piston and a compressor piston freely movable in said cylinders respectively, said pistons being rigid with each other to form together a moving unit, means for feeding air under pressure from said compressor cylinder to said power cylinder, a discharge conduit leading from said power cylinder, a pneumatic energy accumulator for storing up energy from said moving unit during the power strokes thereof and restoring said energy to said unit during the return strokes thereof, means for feeding fuel to said power cylinder, a receiver machine having its intake connected to said discharge conduit so as to be operated by the gas stream issuing from said power cylinder, means for varying said fuel feed means in response to variations in both directions in the value of the load of said receiver machine, correcting means for controlling fuel injection timing, correcting means for limiting the range of variation of said fuel feed means, and means responsive to only sudden increases of the load of said receiver machine for varying the action of both of said correcting means in accordance with said sudden increases of said load.

4. A combination according to claim 3 in which said last mentioned means include a sliding member, means for operatively connecting said sliding member with both of said correcting means, a second sliding member in line with the first one and arranged to push it for one direction of movement, said second sliding member being movable in said direction in response to only sudden increases of the load of said receiver machine, and resilient means for urging said second member in the opposed direction.

5. In combination, a free piston auto-generator including a power cylinder and a compressor cylinder fixed with respect to each other, a power piston and a compressor piston freely movable in said cylinders respectively, said pistons being rigid with each other to form together a moving unit, means for feeding air under pressure from said compressor cylinder to said power cylinder, a discharge conduit leading from said power cylinder, a pneumatic energy accumulator for storing up energy from said moving unit during the power strokes thereof and restoring said energy to said unit during the return strokes thereof, means for feeding fuel to said power cylinder, a receiver machine having its intake connected to said discharge conduit so as to be operated by the gas stream issuing from said power cylinder, means for regulating said fuel feed means in response to variations in the load of said receiver machine, a stabilizer for varying the mass of air present in said accumulator in response to variations in the working pressure of said auto-generator and means for acting constantly on said stabilizer in accordance first with a pressure equal to that existing in said accumulator for a given position of said moving unit, said pressure acting on said stabilizer in one direction, secondly with a pressure proportional to the working pressure of the generator and thirdly with a pressure proportional to the load of said driven machine, said two last mentioned pressures acting on said stabilizer in a direction opposed to said first mentioned direction.

6. In combination, a free piston auto-generator including a power cylinder and a compressor cylinder fixed with respect to each other, a power piston and a compressor piston freely movable in said cylinders respectively, said pistons being rigid with each other to form together a moving unit, means for feeding air under pressure from said compressor cylinder to said power cylinder, a discharge conduit leading from said power cylinder, a pneumatic energy accumulator for storing up energy from said moving unit during the power strokes thereof and restoring said energy to said unit during the return strokes thereof, means for feeding fuel to said power cylinder, a receiver machine having its intake connected to said discharge conduit so as to be operated by the gas stream issuing from said power cylinder, means for varying said fuel feed means in response to variations in both directions in the value of the load of said receiver machine, correcting means for controlling fuel injection timing and means responsive to only sudden increases of the load of said receiver machine for varying the action of said correcting means in accordance with said sudden increases of said load.

7. In combination, a free piston auto-generator including a power cylinder and a compressor cylinder fixed with respect to each other, a power piston and a compressor piston freely movable in said cylinders respectively, said pistons being rigid with each other to form together a moving unit, means for feeding air under pressure from said compressor cylinder to said power cylinder, a discharge conduit leading from said power cylinder, a pneumatic energy accumulator for storing up energy from said moving unit during the power strokes thereof and restoring said energy to said unit during the return strokes thereof, means for feeding fuel to said power cylinder, a receiver machine having its intake connected to said discharge conduit so as to be operated by the gas stream issuing from said power cylinder, means for varying said fuel feed means in response to variations in both directions in the value of the load of said receiver machine, correcting means for limiting the range of variations of said fuel feed means in response to only sudden increases of the load of said receiver machine for varying the action of said correcting means in accordance with said sudden increases of said load.

8. In combination, a free piston auto-generator including a power cylinder and a compressor cylinder fixed with respect to each other, a power piston and a compressor piston freely movable in said cylinders respectively, said pistons being rigid with each other to form together a moving unit, means for feeding air under pressure from said compressor cylinder to said power cylinder, a discharge conduit leading from said power cylinder, a pneumatic energy accumulator for storing up energy from said moving unit during the power strokes thereof and restoring said energy to said unit during the return strokes thereof, means for feeding fuel to said power cylinder, a receiver machine having its intake connected to said discharge conduit so as to be operated by the gas stream issuing from said power cylinder, means for regulating said fuel feed means in response to variations in the load of said receiver machine, a stabilizer for varying the mass of air present in said accumulator in response to variations in the working pressure of said auto-generator and means for acting constantly on said stabilizer in accordance first with a pressure equal to a characteristic pressure of said accumulator, said pressure acting on said stabilizer in one direction, secondly with a pressure proportional to the working pressure of the generator and thirdly with a pressure proportional to the load of said driven machine, said two last mentioned pressures acting on said stabilizer in a direction opposed to said first mentioned direction.

9. In combination, a free piston auto-generator including a power cylinder and a compressor cylinder fixed with respect to each other, a power piston and a compressor piston freely movable in said cylinders respectively, said pistons being rigid with each other to form together a moving unit, means for feeding air under pressure from said compressor cylinder to said power cylinder, a discharge conduit leading from said power cylinder, a pneumatic energy accumulator for storing up energy from said moving unit during the power strokes thereof and restoring said energy to said unit during the return strokes thereof, means for feeding fuel to said power cylinder, a receiver machine having its intake connected to said discharge conduit so as to be operated by the gas stream issuing from said power cylinder, means for regulating said fuel feed means in response to variations in the load of said receiver machine, a stabilizer for varying the mass of air present in said accumulator in response to variations in the working pressure of said auto-generator and means for acting constantly on said stabilizer in accordance first with a pressure equal to a characteristic pressure of said accumulator, said pressure acting on said stabilizer in one direction, secondly with a pressure proportional to the working pressure of the generator, said second mentioned pressure acting on said stabilizer in the opposed direction, and thirdly with a pressure variable in accordance with the load of said driven machine, this third mentioned pressure acting on said stabilizer in a direction such that variation thereof causes said stabilizer to increase the mass of air in said accumulator when this load increases and to reduce this mass of air when this load decreases.

References Cited in the file of this patent

UNITED STATES PATENTS

| | | |
|---|---|---|
| 2,355,924 | Pateras Pescara | Aug. 15, 1944 |
| 2,520,295 | Welsh et al. | Aug. 29, 1950 |
| 2,535,558 | Welsh | Dec. 26, 1950 |
| 2,659,194 | Huber | Nov. 17, 1953 |
| 2,823,653 | Dildine | Feb. 18, 1958 |

FOREIGN PATENTS

| | | |
|---|---|---|
| 1,109,284 | France | Sept. 21, 1955 |
| 659,428 | Great Britain | Oct. 24, 1951 |